Sept. 13, 1927.  E. J. WUERTHELE  1,642,286

BOWLING ALLEY TEN PIN

Filed June 3, 1926

Inventor
Edwin J. Wuerthele
By Clarke & Doolittle
Attorneys

Patented Sept. 13, 1927.

1,642,286

UNITED STATES PATENT OFFICE.

EDWIN J. WUERTHELE, OF PITTSBURGH, PENNSYLVANIA.

BOWLING-ALLEY TENPIN.

Application filed June 3, 1926. Serial No. 113,374.

My invention relates to improvements in ten pins for bowling alleys of the kind usually known as duck pins. It has for its object to provide a reinforcing and stabilizing base for the lower tapered supporting terminal of the pin, capable of protecting the wood from wear and damage, while providing for the proper balance with ease of tipping.

A further object in view is to provide a reinforced centralizing stem cavity for the usual centering pin.

In the drawings illustrating the invention;

Figure 1:
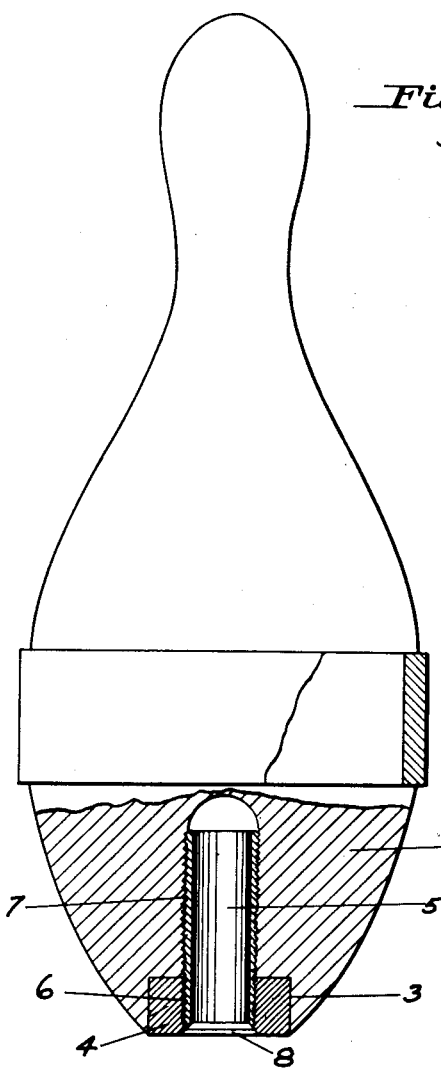
Fig. 1 is a view of a ten pin in elevation partly broken away, generally called a duck pin.

Ordinarily, in the use of ten pins and particularly duck pins, the bottom supporting end is tapered inwardly providing a comparatively small annular supporting area. In the use of such pins, they are subject to severe shocks tending to slit or wear the wood, and especially in placing the pins on the location spots on the alley floor.

To provide a reinforcement for such portion, an inserted ring of hard durable material has been used, as in the patent of Sawyer, 1,030,834, and which his proved generally useful and serviceable.

In the modern method of centering pins on their spots, the bowling alley is provided with a set of vertically adjustable pins which are raised and lowered through the center of the location spots, and the duck pin is provided with an upwardly extending pin hole or socket for placement on such centering pin when raised, the pins then being lowered, leaving the duck pins in proper position for bowling.

Such centering pins, however, wear the interior cavity, tending to inaccuracy and also greatly weaken the holding connection between the base of the duck pin and the inserted ring.

The object of my invention is to so construct a ten pin or duck pin that it will be provided with an inserted supporting ring and also a lining for the central cavity, as to not only protect and reinforce such portion, but which will also assist in reinforcing and strengthening the connection between the terminal ring and the body of the duck pin.

To such end, the bottom of the duck pin 2 is provided with an annular counterbore cavity 3 for reception of the inserted ring 4, of fibre or other suitable hard resisting material.

As shown, the tapering sides of the duck pin terminate at or about the outer annular edge of ring 4, which is set inwardly a sufficient distance in tight binding engagement with the side and bottom of the cavity.

For the purpose of protecting the central pin hole cavity, I provide a tubular ferrule or sleeve section 5, having threaded engagement with the inner side of ring 4 as at 6, and also with the inner wall of the centering pin socket as at 7.

The lower end of the ring 4 and of the tube 5 is preferably rounded or chamfered as at 8 for easy insertion of the centering pin.

By such construction it will be seen that ring 4, in addition to its tight fitting engagement and connection with the base of the duck pin in socket 3, either with or without binding cement, is also fixedly connected with the main body of the duck pin by the threaded tube 5. Said tube in addition to such connection, also provides the inner protecting wall for the centering pin cavity, and the construction provides for a strong, enduring and efficient support and with unvarying diameter of the centering pin cavity.

Figure 5:
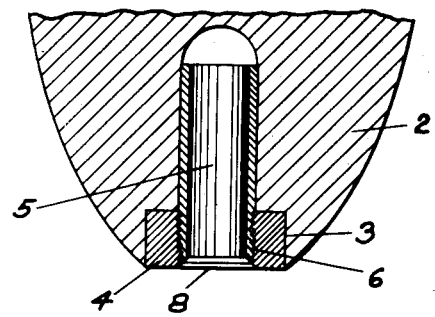
Fig. 5 is a partial sectional view like Fig. 1 showing a modified construction.
Figure 3:
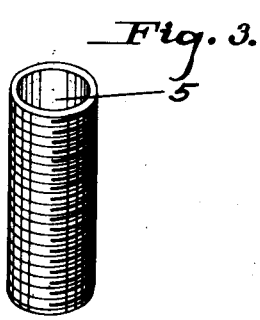
Fig. 3 is a detail view of the inserted projecting ferrule or lining for the centering pin cavity.
Figure 4:
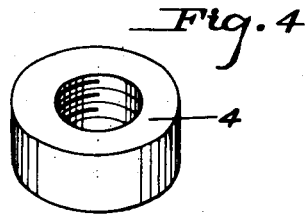
Fig. 4 is a similar view of the co-operating inserted supporting ring.
Figure 2:
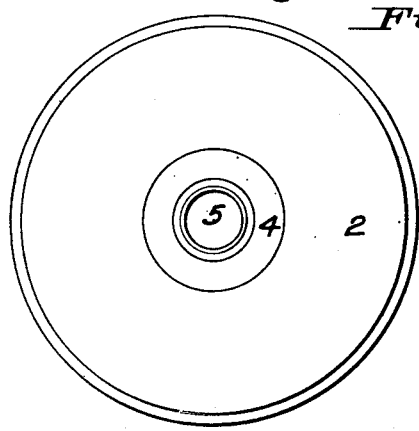
Fig. 2 is an under plan view of Fig. 1.

If desired, tube 5 may be merely threaded into the ring 4 as at 6 and its remaining upper portion driven tightly into the central receiving socket of the body, as in Fig. 5.

With either construction, the device is serviceable and continuously efficient and enduring under the severe usage customary with devices of its kind.

Having described my invention, what I claim is:—

1. A bowling alley ten pin having its base provided with an annular socket and an inner extended centernig pin cavity, a supporting ring in said socket, and a tubular lining member connected with said ring and having threaded engagement with the inner body portion of the ten pin around the centering pin cavity.

2. A bowling alley ten pin having its base provided with an annular socket and an inner extended centering pin cavity, a supporting ring in said socket, and a tubular lining member inserted in the centering pin cavity and having threaded connection with the supporting ring.

3. A bowling alley ten pin having its base provided with an annular socket and an inner extended centering pin cavity, a supporting ring in said socket, and a tubular lining member having threaded connection with the inner wall of the centering pin cavity and with the supporting ring respectively.

4. In combination with a bowling pin having a downwardly tapering body, an annular socket in the base thereof, and a central upwardly extending centering pin cavity; a supporting ring tightly inserted in the annular socket with its bottom flush with the lower edge of the pin, and a tubular lining member fixedly connected with the ring and extending upwardly within the centering pin cavity.

5. A bowling pin having in its base a centering pin hole and a laterally enlarged counterbore, a bearing ring seated in the counterbore, and a separate wear-preventing tube extending into and fixedly connected with the bearing ring and with the pin hole wall respectively.

6. A bowling pin having in its base a centering pin hole and a laterally enlarged counterbore, and a bearing ring seated in the counterbore provided with a tubular sleeve having threaded engagement with the wall of the pin hole.

7. A bowling pin having in its base a centering pin hole and a laterally enlarged counterbore, and a bearing ring seated in the counterbore provided with a fixedly connected separable tubular sleeve having threaded engagement with the wall of the pin hole.

8. A bearing ring for a bowling pin having an extended centering pin tube separately connected to the bearing ring and provided with a threaded exterior.

9. Wear preventing and centering pin lining members for a bowling pin consisting of a bearing ring and an externally threaded centering pin tube screwed thereinto and provided with a continuously smooth uninterrupted interior pin-receiving cavity.

In testimony whereof I affix my signature.

EDWIN J. WUERTHELE.